(12) United States Patent
Tovar Nuez et al.

(10) Patent No.: US 12,196,595 B2
(45) Date of Patent: Jan. 14, 2025

(54) RECYCLABLE DOSING DEVICE

(71) Applicant: SOCIETE DES PRODUITS NESTLE S.A., Vevey (CH)

(72) Inventors: Miguel Daniel Tovar Nuez, Morges (CH); Christophe Barde, Corseaux (CH); Olivier Breton, Rueyres (CH); Alexey Vishtal, Lausanne (CH); Luis Fernando Rueda, Munsingen (CH); Gerhard Niederreiter, Vevey (CH); Christian Saclier, Annecy (FR)

(73) Assignee: Societe des Produits Nestle S.A., Vevey (CH)

( * ) Notice: Subject to any disclaimer, the term of this patent is extended or adjusted under 35 U.S.C. 154(b) by 83 days.

(21) Appl. No.: 17/758,822

(22) PCT Filed: Jan. 8, 2021

(86) PCT No.: PCT/EP2021/050213
§ 371 (c)(1),
(2) Date: Jul. 14, 2022

(87) PCT Pub. No.: WO2021/144194
PCT Pub. Date: Jul. 22, 2021

(65) Prior Publication Data
US 2023/0042230 A1  Feb. 9, 2023

(30) Foreign Application Priority Data
Jan. 17, 2020 (EP) .................................. 20152545

(51) Int. Cl.
*G01F 19/00* (2006.01)
*D21J 1/16* (2006.01)
*D21J 3/00* (2006.01)

(52) U.S. Cl.
CPC .............. *G01F 19/002* (2013.01); *D21J 1/16* (2013.01); *D21J 3/00* (2013.01)

(58) Field of Classification Search
CPC .............. G01F 19/002; D21J 1/16; D21J 3/00
See application file for complete search history.

(56) References Cited

U.S. PATENT DOCUMENTS

| 2015/0284911 A1* | 10/2015 | Juvonen ................. B32B 21/13 |
| | | 442/385 |
| 2018/0029776 A1 | 2/2018 | Chung et al. |

FOREIGN PATENT DOCUMENTS

| GB | 2449721 | 12/2008 |
| JP | 08176999 | 7/1996 |

(Continued)

OTHER PUBLICATIONS

Russian Office Action for Appl No. 2022121629/03 dated Apr. 25, 2024, 9 pages.

(Continued)

*Primary Examiner* — Jamel E Williams
(74) *Attorney, Agent, or Firm* — K&L Gates LLP (57) ABSTRACT

The present invention relates generally to the field of recyclable dosing devices. In particular, the present invention relates to a dosing device made from moulded pulp fiber. The dosing device comprises a container member with a defined volume corresponding to a pre-determined amount of composition to be dosed. The dosing device may be to be used for dosing food materials. Embodiments of the present invention relate to biodegradable and/or compostable dosing devices. The present invention also relates to process for manufacturing such a dosing device.

19 Claims, 4 Drawing Sheets

(56) References Cited

FOREIGN PATENT DOCUMENTS

| | | | |
|---|---|---|---|
| JP | 08176999 A | * | 7/1996 |
| JP | 09123300 | | 5/1997 |
| JP | 09123300 A | * | 5/1997 |
| RU | 2249636 C2 | | 4/2005 |
| RU | 2610511 C2 | | 2/2017 |
| RU | 2633127 C2 | | 10/2017 |
| RU | 2648473 C2 | | 3/2018 |
| RU | 2687768 C2 | | 5/2019 |
| RU | 2694755 C2 | | 7/2019 |
| WO | WO-2021198290 A1 * | 10/2021 | ................ D21J 1/02 |

OTHER PUBLICATIONS

European Office Action for Appl No. 24188100.2-1001 dated Oct. 24, 2024, 8 pages.

* cited by examiner

RECYCLABLE DOSING DEVICE

CROSS REFERENCE TO RELATED APPLICATIONS

The present application is a National Stage of International Application No. PCT/EP2021/050213, filed on Jan. 8, 2021, which claims priority to European Patent Application No. 20152545.8, filed on Jan. 17, 2020, the entire contents of which are being incorporated herein by reference.

The present invention relates generally to the field of recyclable dosing devices. In particular, the present invention relates to a dosing device made from moulded pulp fiber. The dosing device comprises a container member with a defined volume corresponding to a pre-determined amount of composition to be dosed. The dosing device may be to be used for dosing food materials. Embodiments of the present invention relate to biodegradable and/or compostable dosing devices. The present invention also relates to processes for manufacturing such a dosing device.

Dosing devices for food and beverage powders are usually disposable and made from plastic. This has the advantage that no significant amount of weight is added, hygiene can easily be ensured and precise dosing is possible. While there can be great benefits derived from the use of plastics, which have a positive impact on the lives of people every day, there are also negative impacts that need consideration.

Plastic waste is one of the great environmental challenges today. Despite the fact that many kinds of plastic are recyclable today, they often are not recycled and end up in the environment where they will remain for a long time, in particular if they are not—or only slowly—biodegradable. Plastics in the environment, for example in the oceans, are a threat to the environment and wildlife.

Accordingly, the European Parliament has recently approved a new law including a ban on single-use plastic items such as plates, cutlery, straws and cotton buds sticks in the European Union by 2021.

According to the World Health Organisation, plastic accounts for about 10% of all of the waste generated. Each year, at least 8 million tons of plastic end up in the oceans.

In the last decade, more plastic was produced than in the last century with 50% of the plastic we use being single use or disposable.

To address this, great efforts are undertaken by the industry to improve recycling rates and to replace plastic solutions by non-plastic alternatives. Wood-based spoons, for example are readily available, however, they are relatively heavy. Also, paper-based spoon alternatives are available, however, they usually do not allow precise dosing.

Further, when dosing food compositions, such as infant formula, growing-up milk powders or beverage modifiers, consumers are used to a certain shape of a dosing device, which is a dosing device comprising an elongated handle member and a container member with an essentially cylindrical shape. Such a shape is difficult to provide in a paper based form, as paper based spoons are usually folded. If manufactured from one piece of wood, making such a dosing device will require a lot of raw material. If it is made from several pieces of wood, these wood pieces would have to be joined using glue potentially leaving gaps, which will lead to inaccuracies in dosing. In addition, hygiene matters would have to be addressed.

Precise dosing, however, is essential, for example for powdered food compositions. For example compositions to be reconstituted in a liquid, such as milk or water, need to be dosed precisely to ensure optimal taste, but also to ensure the optimal nutritional composition of the final product. This is essential, for example, for compositions such as powdered infant formula or powdered nutritional compositions, e.g., for frail or hospitalized people.

Moulded pulp fiber is a material that is well known in the art. It is typically used for the manufacture of egg cartons, isolation material or storage or protection materials for larger items. Moulded pulp fiber is available from several manufacturers and is typically used to provide honeycomb type packaging, for example. It can be used in several shapes or forms, but to the inventors best knowledge has never been used for the manufacture of dosing devices. The inventors believe that this might be due to the typically rough surface of packaging items produced from moulded pulp fiber. Such a rough surface makes precise dosing difficult and leads to incomplete emptying of the dosing device, resulting in possible hygiene issues.

Any reference to prior art documents in this specification is not to be considered an admission that such prior art is widely known or forms part of the common general knowledge in the field.

It would therefore be desirable to provide the art with a dosing device, a process to produce such a dosing device and a use of the dosing device that overcome at least some of these and/or other disadvantages of dosing devices of the prior art.

The objective of the present invention was it, hence, to improve or enrich the state of the art and, in particular, to provide the art with a dosing device that is made from recyclable, ideally recycled, material, is recyclable itself, and that allows precise and hygienic dosing of, for example, food grade material; a method to produce such a dosing device and a use of that dosing device to dose a composition to be dosed; or to at least provide a useful alternative.

The inventors were surprised to see that the objective of the present invention could be achieved by the subject matter of the independent claims. The dependent claims further develop the idea of the present invention.

Accordingly, the present invention provides a dosing device made from moulded pulp fiber comprising a container member and a handle member, wherein the container member has a defined volume corresponding to a pre-determined amount of a composition to be dosed. The present invention further provides a process to manufacture a dosing device in accordance with the present invention comprising the steps of dewatering the pulp, pressing the dewatered pulp into the form of the dosing device, and drying the formed dosing device. The present invention further provides the use of the dosing device in accordance with the present invention for dosing a composition to be dosed, wherein the composition to be dosed may be selected from the group consisting of powdered or granulated compositions.

As used in this specification, the words "comprises", "comprising", and similar words, are not to be interpreted in an exclusive or exhaustive sense. In other words, they are intended to mean "including, but not limited to".

The present inventors were surprised to see that they could use moulded pulp fiber to produce a dosing device that achieves the objective of the present invention. Remarkably, while moulded pulp fiber is typically used in the present prior art for larger packaging material that is used to protect sensitive equipment and material, the present inventors have now shown that moulded pulp fiber can also be used to produce dosing devices, for example dosing devices of relatively small dimensions where precision of dosing is important.

Hence, the present invention relates, for example, to a dosing device made from moulded pulp fiber comprising a container member and a handle member, wherein the container member has a defined volume corresponding to a pre-determined amount of a composition to be dosed.

The dosing device of the present invention may be made from recycled material. Alternatively and/or additionally, the dosing device of the present invent may be recyclable, for example, recyclable with the paper stream.

The present invention further relates to a process to manufacture a dosing device in accordance with the present invention comprising the following steps
dewatering the pulp,
pressing the dewatered pulp into the form of the dosing device, and
drying the formed dosing device.

Even further, the present invention further relates to the use of a dosing device in accordance with the present invention for dosing a composition to be dosed, wherein the composition to be dosed may be selected from the group of powdered or granulated compositions, for example food compositions.

Consequently, the present invention relates in part to a dosing device made from moulded pulp fiber comprising a container member and a handle member, wherein the container member has a defined volume corresponding to a pre-determined amount of a composition to be dosed.

For the purpose of the present invention, the term "dosing device" as used herein refers to a device that can be used for dosing. For example, it can mean any device intended to measure and deliver a certain quantity of a composition to be dosed. For the purpose of the present invention, the certain quantity may be the dosage of the composition to be dosed for a single consumption occasion or a fraction thereof. The dosing device of the present invention comprises a container member and a handle member. The container member can have any shape that allows it to take up a certain volume of the material to be used. For example, the shape of the container member may be adapted so that it corresponds to a typical shape that resembles the brand of the composition to be dosed. The container member may have a volume that corresponds exactly to the amount of the composition to be dosed for a single consumption occasion or a fraction thereof. Typically, the container member may have a cylindrical, oval, cubic or a cuboidal shape. Advantageously, the upper edge or upper edges of the container member of dosing device of the present invention form a plane. This has the consequence that after filling of the container member any excess composition to be dosed can be scraped off with any device with a straight edge, so that as a result the container member is precisely filled to the plane formed the upper edge or upper edges of the container member.

The inventors were surprised to see that they could produce dosing devices of relatively small dimensions from moulded pulp fiber. For example, it was possible to produce dosing devices with a length of less than 15 cm, less than 13 cm, less than 11 cm, less than 9 cm, less than 7 cm or less than 5 cm in their longest dimension. If the longest dimension is considered the length of the dosing device, the width of the dosing device could be less than 5 cm, less than 4 cm, less than 3 cm, less than 2 cm or less than 1 cm. For example, a dosing device of the present invention could have a length of less than 15 cm and a width of less than 4 cm. It could also have a length of less than 15 cm and a width of less than 3 cm. It could also have a length of less than 13 cm and a width of less than 3 cm. It could also have a length of less than 13 cm and a width of less than 2 cm. It could also have a length of less than 11 cm and a width of less than 2 cm.

For the purpose of the present invention, the term "moulded pulp fiber" is a fibrous packaging material comprising lignocellulosic fibers, typically made from recycled paperboard, paper and/or newsprint, through pulping. Alternatively or additionally, the lignocellulosic fibrous material may also be obtained from chemically or mechanically separating cellulose fibers from wood, fiber crops, waste paper, or rags.

For example, in the dosing device in accordance with the present invention the moulded fiber may be made from pulp comprising cellulosic fibrous material prepared by chemically and/or mechanically separating cellulose fibers from material containing cellulose fibers. The material containing cellulose fibers may be selected from the group consisting of wood, fiber crops, waste paper, rags, or combinations thereof. The inventors were able to produce particularly good results, if the material containing cellulose fibers comprised not less than 20 vol.-% of softwood long fibers, not less than 15 vol.-% of softwood long fibers, or not less than 10 vol.-% of softwood long fibers. The remaining fibers can be hardwood fibers, non-wood short fibers, or a combination thereof.

In one embodiment of the dosing device in accordance with the present invention, the pulp comprises cellulose, hemicellulose and lignin. Without wishing to be bound by theory, the present inventors believe that hemicellulose provides a better adhesion between cellulose nanofibrils, contributing enhanced tensile properties of the resulting dosing device. Hence, the inventors find that dosing devices made from pulp with higher hemicellulose content showed a higher stiffness and tensile strength, compared to dosing devices made from pulp with a lower hemicellulose content. Lignin in the pulp has an influence on the texture and flexibility of the final dosing device. Those skilled in the art will be able to adjust the ratio of cellulose, hemicellulose and lignin so that the resulting dosing device has appropriate properties. The inventors have found that for the purpose of the present invention a ratio of 80:19:1 is preferred for cellulose, hemicellulose and lignin.

The pulp may further comprise a compound selected from the group consisting of alkyl ketene dimer wax, a fluorine containing polymer moiety, sodium silicate, or combinations thereof.

Alkyl ketene dimer wax may be used for the surface modification of the resulting dosing device. Typically, the use of alkyl ketene dimer wax in the pulp may provide the resulting dosing device with higher and longer-lasting hydrophobicity. The use of a fluorine containing polymer moiety in the pulp may impart to the dosing device an improved resistance to low surface tension fluids, leading for example to an improved grease, oil, wax and solvent repellency. The fluorine containing polymer moiety may be a fluorine containing polymer moiety approved for use in contact with food products, for example. For example, the fluorine containing polymer moiety may be a copolymer comprising carbon and fluorine moieties, a polymer comprising phosphate and fluorine moieties, or a fluoroalkyl polymer. Examples may be selected from the group consisting of perfluoroalkylethylphosphate diethanolamine, ammonium di-[2-(N-ethyl-heptadecafluorosulfonamido)ethyl] phosphate, poly(2-(N-methyl-heptadecafluorosulfonamido) ethyl acrylate)-co-(2,3-epoxypropylacrylate)-co-(2-ethoxyethylacrylate)-co-(2-(2-methylpropenyloyloxy)ethyl-trimethylammonium chloride), or combinations thereof. The use of sodium silicate in the pulp may lead to a dosing device with an increased strength. It may also be used as additive during a bleaching process in pulp, for example with hydrogen peroxide. It may further be used as an adhesive in the pulp.

The dosing device may be coated with a compound or a mixture of compounds. Suitable coatings are well-known to those skilled in the art. A coating can serve to impart certain qualities to the surface of the dosing device, including weight, surface gloss, smoothness or reduced ink absorbency. For example, the dosing device can be coated with wax, kaolinite, calcium carbonate, bentonite, talc, polyethylene, polyolefin, silicone, and biopolymers.

The dosing device of the present invention may be recyclable. "Recyclable" means that the material can be treated or processed to make it suitable for reuse in a different use. This has the advantage, for example, that not only plastic waste is avoided, but also that by eliminating the need for conventional waste disposal energy usage can be reduced, greenhouse gas emission can be reduced, the consumption of fresh raw materials is reduced, and/or air pollution and water pollution (e.g., from land filling) is reduced.

The dosing device of the present invention may be made from recyclable and/or recycled material. For example, the dosing device of the present invention may be made from material that is recyclable with the paper stream. It may also be made from material recycled with the paper stream. This has the advantage that—as paper recycling streams are widely available—such dosing devices are not only recyclable but can also be easily recycled wherever paper recycling is available.

In a further embodiment of the present invention, the dosing device of the present invention is biodegradable and/or compostable. Biodegradable materials break down and decompose into natural elements. Consequently, biodegradation helps to reduce the buildup of waste. Compostable materials also break down and decompose into natural elements within a relatively short time after disposal and provide the earth with nutrients once the material has completely broken down. Typically, such materials can be added to compost sites with specific biological conditions.

To ensure that a product is as environmentally friendly as possible, the whole lifecycle of a product can be taken into account. It is also beneficial if a product such as the dosing device of the present invention is manufactured from sustainable resources. Hence, for example, the dosing device may be manufactured from sustainable resources.

Hence, in one embodiment of the present invention the dosing device is recyclable and/or compostable.

The dosing device of the present invention must be stable enough that it does not break during transport or usage. This stability depends, for example, on the thickness of the material that forms the container and on the thickness of the material that forms the handle member. The person skilled in the art will be able to devise an appropriate material thickness. For example, in the dosing device in accordance with the present invention the container member may have a material thickness in the range of 300 µm-3 mm, 500 µm-2 mm, 600 µm-1 mm. Further, the handle member may have a material thickness in the range of 300 µm-5 mm, 500 µm-4 mm, or 700 µm-3 mm. The handle member of the dosing device of the present invention may have a bigger material thickness than the container member of the dosing device. This has the advantage that a thicker handle member is usually more pleasant to handle than a thinner handle member. For example, the handle member and the container member may have a material thickness ratio in the range of 1.5:1 to 10:1, 2:1 to 5:1, or 3:1 to 4:1.

The volume of the container member of the dosing device may be adjusted so that if the container member is filled completely with the composition to be dosed, the volume of the composition to be dosed corresponds to the amount of composition needed for a single consumption occasion. For example, the container member may have a volume that holds 1, ½, ⅓, ¼, ⅕, ⅙, ⅐, ⅛, ⅑ or ⅒ of a serving size of the composition to be dosed. Accordingly, the container member may have a volume of 1-20 $cm^3$, 2-15 $cm^3$, or 3-8 $cm^3$.

The handle member may have a length that is convenient to handle. For example, the handle member may have a length of 3-20 cm, 5-15 cm, or 7-13 cm.

It is within the skill of the person skilled in the art to adjust the pulp composition and the material thickness of the dosing device so that the dosing device exhibits a suitable bending stiffness. In general, the larger the dosing device is intended to be, the higher the ideal bending stiffness is. For example, the dosing device may have a bending stiffness in the range of 10 to 80 mNm in machine direction (MD) and/or 5 to 40 mNm in cross direction (CD). The bending stiffness can be determined in accordance with ISO 5628.

The inventors currently believe that this is suitable for typical applications, such as, e.g., for powdered food compositions with a dosing size in the range of 2-30 g.

For many applications of dosing devices in accordance with the present invention precise dosing and hygiene is important. Complete emptying is necessary. If, for example, the container member has an inner surface which is uneven, there is a risk that a certain amount of the composition to be dosed will not empty completely. To avoid this, the surface of the container member of the dosing device made from moulded pulp fiber in accordance with the present invention, in particular the inner surface of the container member may be smoothened. Such smoothening can be achieved by several methods. For example, pressing and heat application may be used to flatten the surface. Hence, in the dosing device in accordance with the present invention, the surface of the dosing device is at least partially smoothened by pressing and heat application, for example, in order to ensure complete emptying. For example, the surface, in particular the inner surface of the container member may be smoothened by pressing and heat application. This will result in a less uneven surface. Additionally or alternatively the dosing device of the present invention, or a part thereof, for example the container member, may be coated with a material that will result in a smooth surface.

It may also me necessary to increase the resistance of the dosing device towards moisture or water uptake. The inventors have found that one way to achieve this is to compact the dosing device. This can be done, for example, by pressing and heat application. Hence, the dosing device of the present invention, or at least a part thereof, for example its edges, may be compacted by pressing and heat application.

The dosing device of the present invention may be further customized, e.g., by making it visually more attractive. For example, the pulp may be colored. This can be achieved by adding colors to the pulp. Certain further optical effects may be achieved. For example glitter particles may be added to the pulp. The dosing device may be further modified, e.g., by embossing and/or debossing it. This way, for example, a brand name can be added to the dosing device, for example, to its handle member. This is not only useful in brand communication, but can also have a safety effect. Clearly marked dosing devices will avoid that dosing devices intended for one composition to be dosed will accidentally be used for another composition to be dosed, which might result in unintended over- or under-dosing. Further, for example, an anti-slip surface pattern may be added to the dosing device of the present invention, for example to its handle member. This will help to avoid wasting the composition to be dosed doe to unintentional spilling of composition during the handling of the dosing device in operation.

The subject matter of the present invention further comprises a process to manufacture a dosing device in accordance with the present invention comprising the steps of dewatering the pulp, pressing the dewatered pulp into the form of the dosing device, and drying the formed dosing device.

A further embodiment of the present invention relates to the use of the dosing device of the present invention for dosing a composition to be dosed.

The composition to be dosed may be any powdered or granulated composition to be dosed, for example. The composition to be dosed may also be a liquid composition for example. If the composition to be dosed is a liquid, it is preferred that the dosing device or at least the part of the dosing device that forms the container member is coated. This will have the advantage that it is avoided that the container member is wetted so that it eventually loses its shape.

For example, the composition to be dosed may be a powdered or granulated food composition. For the purpose of the present invention, the term "food" shall mean in accordance with Codex Alimentarius any substance, whether processed, semi-processed or raw, which is intended for human consumption, and includes drink, chewing gum and any substance which has been used in the manufacture, preparation or treatment of "food" but does not include cosmetics or tobacco or substances used only as drugs. Such a powdered or granulated food composition may be selected from the group consisting of nutritional formulas; infant formulas; milk modifiers; cocoa-based beverage powders; cocoa malt-based beverage powders; coffee; instant food compositions; fruit flavored beverage powders; spice mixtures; drink thickeners; and pet food.

Ideally, correct dosing is ensured by scraping off any excess composition to be dosed from the container member after filling. Hence, in one embodiment of the present invention the container member of the dosing device is filled with the composition to be dosed and a device with a straight edge is used to scrape off any excess material from the filled container member, so that the container member contains exactly the predetermined amount of the composition to be dosed.

Those skilled in the art will understand that they can freely combine all features of the present invention disclosed herein. In particular, features described for the blank of the present invention may be combined with the dosing device of the present invention or the use of the present invention and vice versa. Further, features described for different embodiments of the present invention may be combined.

Although the invention has been described by way of example, it should be appreciated that variations and modifications may be made without departing from the scope of the invention as defined in the claims.

Furthermore, where known equivalents exist to specific features, such equivalents are incorporated as if specifically referred in this specification. Further advantages and features of the present invention are apparent from the figures and non-limiting examples.

EXAMPLES

Manufacturing of a dosing device in accordance with the present invention.

Figure 1:
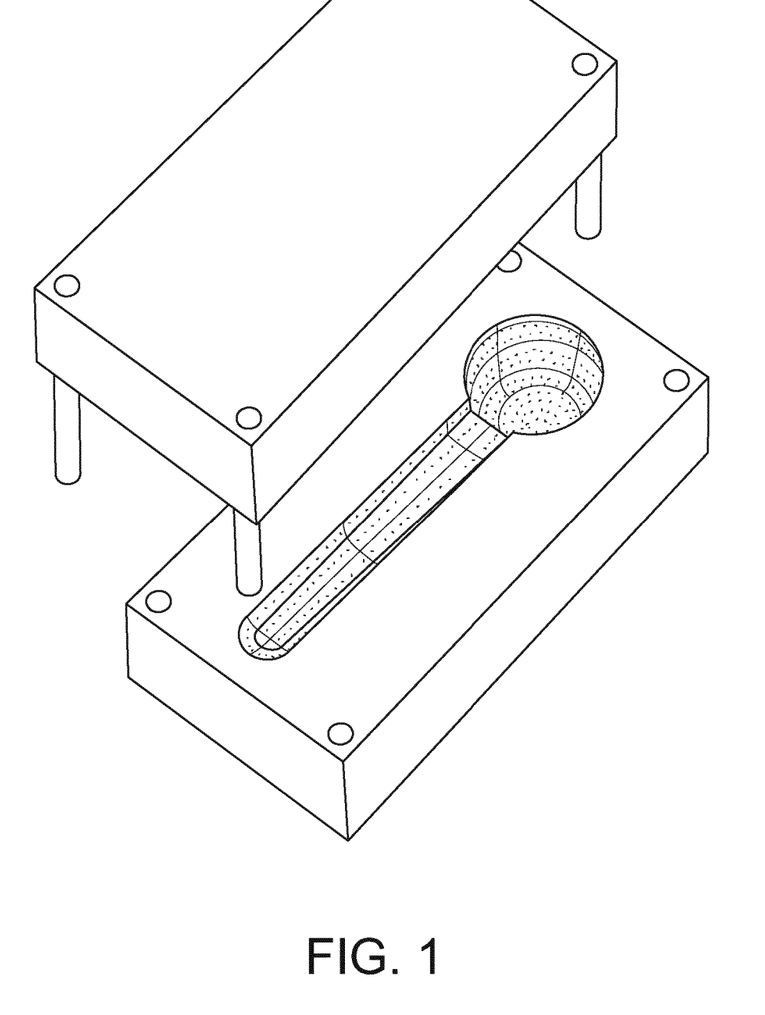
FIG. 1 shows a mould that can be used to manufacture the dosing device of the present invention.

A mould can be prepared from plastic, steel or aluminum, for example. In this case, as plastic mould was used. The mould contained the negative form of the dosing device of the present invention. After preparation, the mould was cleaned. FIG. 1 shows a schematic drafting of a moulding device that can be used in the manufacture of a dosing device in accordance with the present invention.

Figure 2:
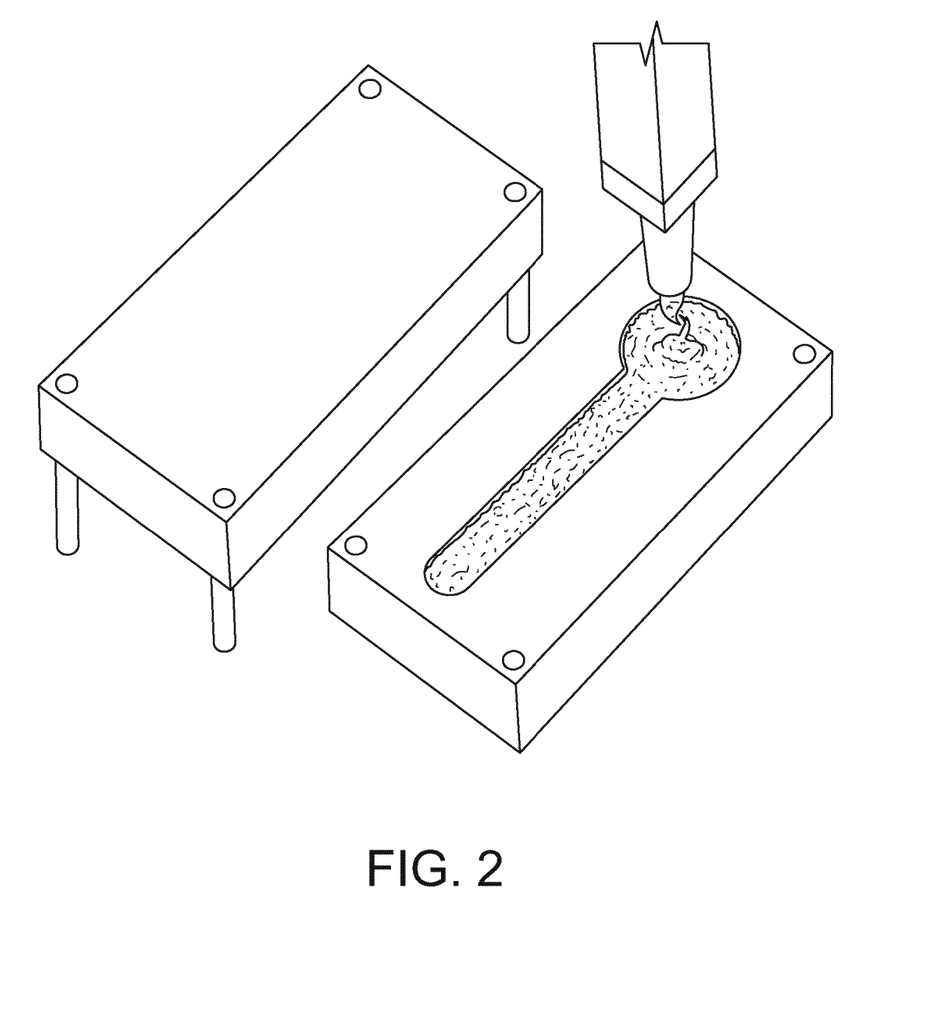
FIG. 2 shows how paper pulp is injected into the mould used to manufacture the dosing device of the present invention.

A pulp was prepared from recycled paper and cardboard by mixing it for 20 minutes in 60° C. warm water. This paper pulp was then dewatered to a water content of 20% w/w and was then injected into the cavity of the mould as shown in FIG. 2.

Figure 3:
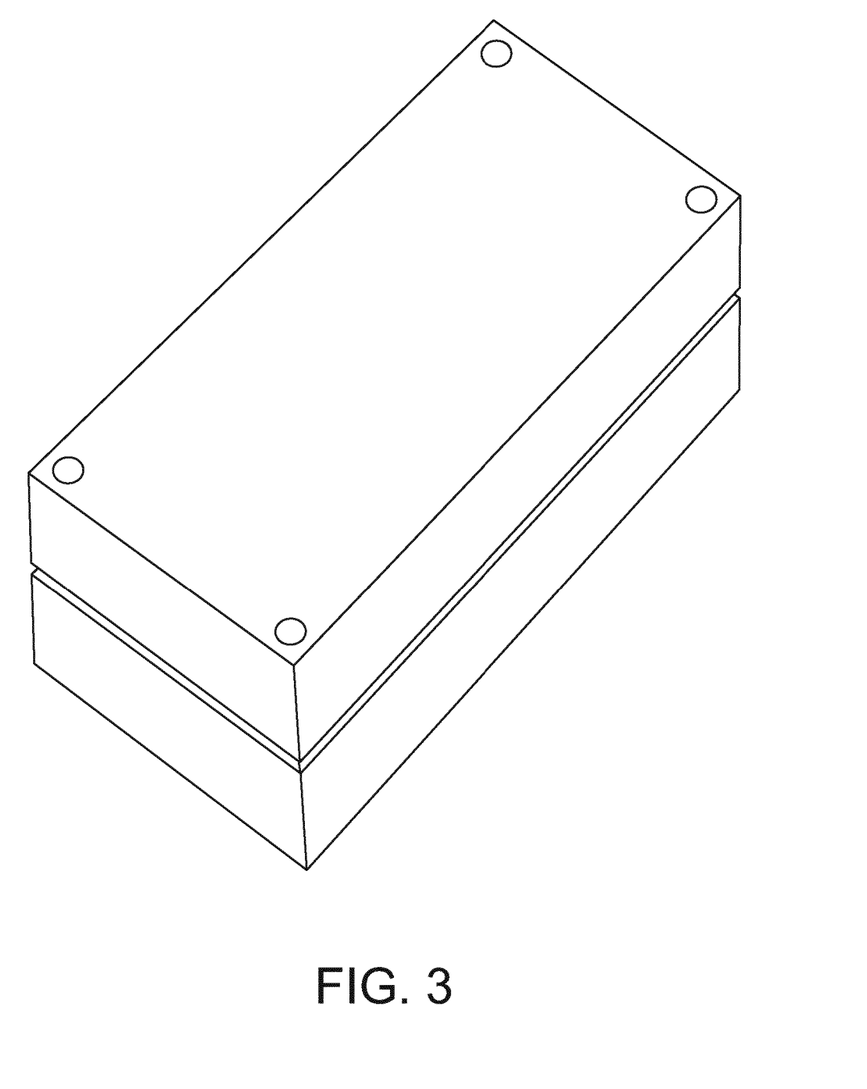
FIG. 3 shows the closed mould filled with paper pulp before it is compressed, heated and dried in the manufacture of the dosing device of the present invention.

The mould was then compressed, heated and dried at a pressure of 3 bar, a temperature of 80° C. for 30 minutes. FIG. 3 shows the closed mould.

Figure 4:
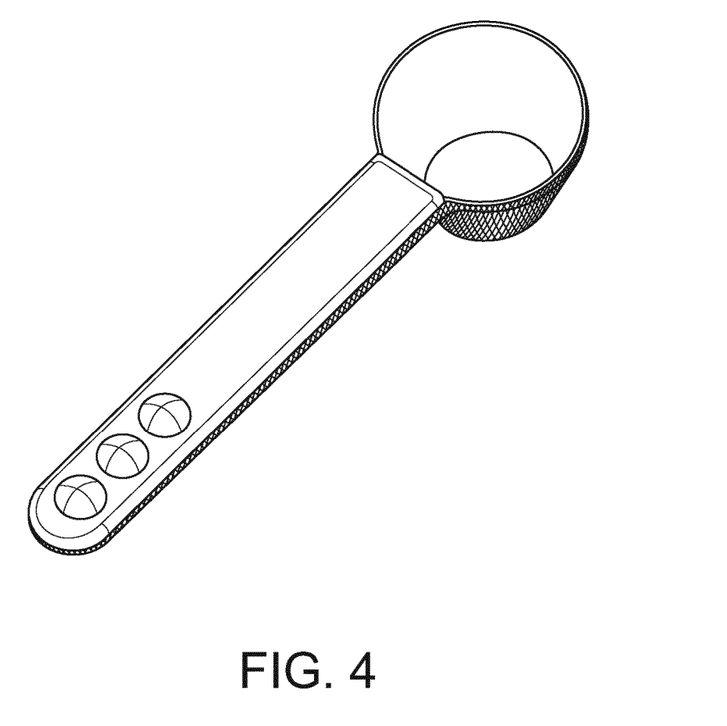
FIG. 4 shows a dosing device of the present invention after extraction from the mould cavity.

Then, the mould is opened and the dosing device is removed from the mould. Any debossed or embossed design element that was part of the negative form of the mould is now revealed in its positive form. The resulting dosing device is shown in FIG. 4. In this case the container member has a material thickness of 800 µm, the handle member has a material thickness 1.5 mm, the container member has a volume of 5 cm$^3$, and the handle member has a length of 10 cm.

The resulting dosing device can then be further treated, for example, by applying a functional surface coating or artwork elements.

The invention claimed is:

1. A dosing device comprising:
   a container member and a handle member both made from molded pulp fiber, wherein:
   the container member has a defined volume corresponding to a pre-determined amount of a composition to be dosed,
   the molded pulp fiber comprises cellulose, hemicellulose and lignin, and
   the molded pulp fiber further comprises a compound selected from the group consisting of alkyl ketene dimer wax, a fluorine containing polymer moiety, sodium silicate, and combinations thereof.

2. The dosing device in accordance with claim 1, wherein the molded pulp fiber is made from pulp comprising cellulosic fibrous material prepared by chemically and mechanically separating cellulose fibers from material containing the cellulose fibers.

3. The dosing device in accordance with claim 2, wherein the material containing cellulose fibers is selected from the group consisting of wood, fiber crops, waste paper, rags, and combinations thereof.

4. The dosing device in accordance with claim 1, wherein the dosing device is recyclable and/or compostable.

5. The dosing device in accordance with claim 1, wherein the container member has a material thickness in the range of 300 μm-3 mm.

6. The dosing device in accordance with claim 1, wherein the container member has a volume of 1-20 cm³.

7. The dosing device in accordance with claim 1, wherein the dosing device has a bending stiffness in the range of 10 to 80 mNm in machine direction (MD) and 5 to 40 mNm in cross direction (CD).

8. The dosing device in accordance with claim 1, wherein a surface of the dosing device is at least partially smoothened by pressing and heat application.

9. The dosing device in accordance with claim 1, wherein the dosing device is colored by adding colors or filler particles to the molded pulp fiber.

10. The dosing device in accordance with claim 1, wherein the dosing device is further modified by embossing, debossing or an anti-slip surface pattern.

11. The dosing device in accordance with claim 1, wherein a ratio of cellulose: hemicellulose: lignin is about 80:19:1.

12. The dosing device in accordance with claim 1, wherein the container member has a material thickness in the range of 500 μm-2 mm.

13. The dosing device in accordance with claim 1, wherein the container member has a material thickness in the range of 600 μm-1 mm.

14. The dosing device in accordance with claim 1, wherein the container member has a volume of 2-15 cm³.

15. The dosing device in accordance with claim 1, wherein the container member has a volume of 3-8 cm³.

16. The dosing device in accordance with claim 1, wherein the handle member has a length of 3-20 cm.

17. The dosing device in accordance with claim 1, wherein the handle member has a length of 5-15 cm.

18. The dosing device in accordance with claim 1, wherein the handle member has a length of 7-13 cm.

19. The dosing device in accordance with claim 1, wherein a material thickness ratio of the handle member: the container member is in the range of 1.5:1 to 10:1.

* * * * *